(12) United States Patent
Del Corso

(10) Patent No.: US 6,963,377 B2
(45) Date of Patent: Nov. 8, 2005

(54) ENCODING METHOD AND DEVICE INCLUDING THRESHOLDING PIXEL-TO-PIXEL DIFFERENCES

(75) Inventor: Sandra Del Corso, Calmart (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 628 days.

(21) Appl. No.: 09/795,020

(22) Filed: Feb. 28, 2001

(65) Prior Publication Data

US 2001/0026328 A1 Oct. 4, 2001

(30) Foreign Application Priority Data

Feb. 29, 2000 (EP) .............................................. 00400551

(51) Int. Cl.⁷ .............................. H04N 5/46; H04N 7/01
(52) U.S. Cl. ........................ 348/558; 348/459; 348/441
(58) Field of Search ................................ 348/554, 558, 348/555, 441, 443, 459, 700, 701, 469, 448, 444, 446, 449, 423.1, 439.1, 401.1, 415.1, 390.1, 97; 382/232, 236, 238, 248

(56) References Cited

U.S. PATENT DOCUMENTS

| | | | | |
|---|---|---|---|---|
| 5,600,376 A | * | 2/1997 | Casavant et al. | 348/423.1 |
| 5,606,373 A | * | 2/1997 | Dopp et al. | 348/459 |
| 5,694,170 A | * | 12/1997 | Tiwari et al. | 348/390.1 |
| 5,742,351 A | * | 4/1998 | Guede | 348/459 |
| 6,282,245 B1 | * | 8/2001 | Oishi et al. | 375/240.28 |
| 6,563,550 B1 | * | 5/2003 | Kahn | 348/700 |

FOREIGN PATENT DOCUMENTS

| | | | | |
|---|---|---|---|---|
| EP | 0588668 A2 | | 9/1993 | |
| JP | 2000125303 | * | 4/2000 | |
| JP | 2001231043 | * | 8/2003 | |
| WO | WO 9739577 | | 10/1997 | H04N/7/01 |

* cited by examiner

Primary Examiner—Sherrie Hsia

(57) ABSTRACT

The invention relates to a method for encoding video signals corresponding to a sequence of frames constituted either from video-type images or film-type images. These film-type images are obtained by means of the 3:2 pull-down technique involving a subdivision of each film frame into two fields and a duplication of two fields within each group of four subdivided frames. The encoding step of the signals is preceded by a preprocessing step that includes thresholding the eight absolute values of the successive pixel-to-pixel differences between fields of the same parity. Measuring the density of "1" (resp. "0") per block of m×n pixels of the field structure leading to mark each pixel as 1 or 0. Detecting in any group of ten successive fields within the preprocessed signals thus obtained, the film pattern formed by the duplicated fields. Switching the preprocessed signals from a first encoding mode to a second one, when the film pattern is detected, or from the second one to the first one, when it is not detected.

3 Claims, 4 Drawing Sheets

ENCODING METHOD AND DEVICE INCLUDING THRESHOLDING PIXEL-TO-PIXEL DIFFERENCES

FIELD OF THE INVENTION

The present invention relates to a method for encoding video signals corresponding to a sequence of frames constituted either of video-type images, at the video format of 30 interlaced frames per second, or film-type images, converted from an original frame rate of 24 Hz to said video type format by means of the 3:2 pull-down technique involving a subdivision of each film frame into two fields and a duplication of two fields within each group of four subdivided frames. It also relates to an encoding device for carrying out said method. This invention may be used for instance when encoding according to the MPEG-2 standard image sequences which include both movies, at 24 Hz, and NTSC video images (30 interlaced frames per second).

BACKGROUND OF THE INVENTION

In the NTSC standard, the picture frequency is 30 interlaced frames per second. However, for movies (that are inherently progressive), the progressive frames are produced at a frame rate of 24 Hz. Displaying a sequence of film-type images (originally at 24 frames) on television, at NTSC rates of 60 video fields per second, therefore requires a conversion process called "3:2 pull-down". This technique, described for instance in the international patent application WO 97/39577, consists of creating five interlaced frames (which can be therefore visualized on television) based on four original sequential (or: progressive) film frames. This is obtained by dividing each of these four sequential frames by two, so as to form four odd and four even fields, and by duplicating two of these eight fields.

As illustrated in FIG. 1, which shows an original film sequence at 24 Hz on the first line and illustrates on the second line how to organize the field sequencing of a video sequence at 30 Hz corresponding to said film sequence, it means that an additional field is inserted for each pair of film frames, for instance by splitting one film frame out of two into three fields, the other one being split as usually into two fields. In the case of the frame split into three fields (for instance, G1G2 split into F1, F2, F3, or G5G6 split into F6, F7, F third one is obtained by copying the odd (F1) or the even field (F6) alternately, in order to keep the sequencing "odd/even". The result is the following (conditions CD1):

F1=F3=G1
F2=G2
F4=G4
F5=G3
F6=F8=G6
F7=G5
F9=G7
F10=G8, and so on.

These two additional fields obtained by duplication constitute a redundant information. When encoding such sequences according to the MPEG-2 standard, it is interesting to detect said information: the suppression of these repeated fields frees some space to better encode the other ones, the concerned MPEG-2 encoder thus receiving both video-type image sequences at 30 Hz and original film-type image sequences at 24 Hz.

An usual criterion to detect automatically sequences coming from movies (film-type image sequences) is therefore the following: a structure of five frames—i.e. of ten fields—is analyzed by means of a subtraction of consecutive fields of the same parity. The conditions to detect the 3:2 pull-down structure (i.e. to detect in any group of ten successive fields the specific film pattern formed by the two duplicated fields) are the following (conditions CD2):

F1=F3
F2≠F4
F3≠F5
F4≠F6
F5≠F7
F6=F8
F7≠F9
F8≠F10, as depicted in the sequence of FIG. 2 showing how fields are sequenced for the film mode format and illustrating the set of tests (identical ? or not ?) to be carried out for the detection of a 3:2 pull-down structure (f1, f2, ... designate the successive frames, 1o–1e, 1o–2e, 2o–3e, ... the corresponding pairs of fields, y the reply "yes" to the test of comparison, i.e. fields equal, and n the reply "no", i.e. fields different). If all these conditions are satisfied, then the inverse 3:2 pull-down conversion (suppression of the two repeated fields) is performed on the corresponding group of five frames; on the contrary, if one of these conditions is not valid, the encoder goes back to the video mode (no elimination of the repeated fields).

However, due to the possible presence of noise on the original 3:2 pull-down sequence, the equality criterion between two fields (F1, F3 and F6, F8) may be not strictly verified. Two fields of the same parity F(N) and F(N+2) are considered. If NTOT designates the total number of pixels in a field (172800 for a full resolution), val (F(N)) designates the luminance value for a given pixel, N1 is the number of picture elements (pixels) such as ABS[val(F(N))–val (F(N+2))]>THRES1, Nm is the number of pixels such as ABS [val(F(N))–val (F(N+2))]<THRES2, N2 is the number of pixels such as N2=NTOT–Nm, and THRES1, THRES2 are predetermined thresholds, then the following test, the values of Ratio 1 and Ratio 2 being previously chosen, is carried out:

IF ((N1<Ratio 1) and (N2<Ratio 2)) THEN: F(N)=F(N+2)

ELSE: F(N)≠F(N+2)

The first criterion (N1<Ratio 1) may be called "the dissimilarity criterion" and involves the number of pixels where the field-to-field pixel difference is large, while the second one (N2<Ratio2) may be called "the likeness criterion" and involves the number of pixels where the field-to-field pixel difference is small.

Troubles within the film mode detection step may consequently occur, mostly in the case of the two following contrasted situations. For static or quasi-static sequences, the dissimilarity criterion is no longer verified, since the fields are nearly all equal. Said criterion is therefore suppressed, the residual conditions needed to be fulfilled being then only F1=F3 and F6=F8 (conditions CD2). But, for a very noisy sequence, with which two identical fields may however seem unlike, the threshold setting the likeness criterion cannot be too increased, otherwise fields that are different could be considered as identical.

The european patent application, previously filed by the applicant under the number 99403228.2 (PHF99621), describes an encoding method (and also a corresponding encoding device) including a film mode detection step with which the above-indicated drawback is now avoided. According to said document, when dealing with noisy images, the criterion for detecting automatically sequences coming from movies is modified on the basis of the following remark. By looking at the N2 statistics, the applicant has noticed that N2 for fields F1 and F3 (referenced N2[1,3]) and N2 for fields F6 and F8 (referenced N2[6,8]) are small compared to the others (more generally, N2[i,j] stands for statistics of N2 calculated for Fj-Fi). Then, by computing the difference between two consecutive N2 statistics, for instance: N2[6,8]−N2[5,7], and comparing—in the form of a percentage—said difference to a predetermined threshold (according to an expression of the following form: N2[5,7]−N2[6,8]×100/NTOT for example), a large value of percentage is obtained every five computations. Therefore, if the computed percentage is less than X %, with for instance X=30%, both fields (of the last considered pair of fields) are considered as equal, and the inverse 3:2 pull-down processing is carried out for the next five frames.

An encoding device in which this preprocessing operation is included is described with reference to FIG. 3 and comprises means 31 for encoding input signals corresponding to input sequences either coming from movies or of video type, means for detecting in the input signals of the encoding device a sequence of film type, and means 33 for switching, only when such a detection has occurred, from a first to a second mode of operation of the encoding means 31 (encoding means 31 are located downstream of said switching means).

The encoding means 31 comprise in series a suppressing stage 311 and a coding stage 312, for instance an MPEG-2 coder. The detecting means consists of a detecting stage 32, illustrated in a more detailed manner in FIG. 4 and comprising first a set of subtractors 41.1, 41.2, 41.3, . . . , provided for receiving each one two successive fields of the same parity and determining per pixel the difference between these fields. These subtractors are followed by a set of circuits 42.1, 42.2, 42.3, . . . provided for taking the absolute value of said difference; this value is stored in a memory, 43.1, 43.2, 43.3, . . . , respectively. The successive differences between the successive values of these stored absolute values are then computed in subtractors 44.1, 44.2, 44.3, . . . , and these differences, for instance multiplied by 100/NTOT as indicated above, are compared to the predefined threshold (comparison tests C1). If the fields can be considered as equal (results "TRUE" of the tests: F1=F3, and F6=F8), the conditions previously called CD2 are satisfied, and the inverse 3:2 pull-down processing is performed on the next group of five frames, in the suppressing stage 311. In the other cases (i.e. if one of the conditions CD2 is no more valid, which corresponds to a result "FALSE" of the tests), the switching means 33 are in the opposite position, and the stage 311 is de-activated: the encoding stage goes back to the video mode (no elimination of the repeated fields: the input of the encoding device is directly connected to the input of the coding stage 312).

In the video sequences now currently handled, one or several objects coded according to the film mode may however be present, and it may then be necessary to detect these objects. As each object can be of any shape and have any random position within the considered successive images, it becomes no longer possible to use the previously described solution (i.e. a detection that is done using some pixel statistics from the complete image), since the film mode coded object(s) size and position within any image are unknown.

SUMMARY OF THE INVENTION

It is therefore an object of the invention to propose an encoding method allowing to solve this problem.

To this end, the invention relates to a method such as defined in the introductory part of the description and which is moreover characterized in that the encoding step of said signals is preceded by a preprocessing step, itself including the sub-steps of:

(A) thresholding the eight absolute values of the successive pixel-to-pixel differences between fields of the same parity for each group of ten successive fields within said input signals, each pixel being marked as 1 (resp.0) when the corresponding absolute value is equal to or greater than a first predefined threshold or as 0 (resp.1) when said absolute value is lower than said first threshold;

(B) measuring the density of "1" (resp. "0") per block of m×n pixels of the field structure, said density being computed for each of said blocks by means of a comparison, to a second predefined threshold, of the ratio between the number of bits at 1 in each block and the average number of bits at 1 in all the blocks, each pixel being marked as 1 (resp.0) when said ratio is equal to or greater than said second threshold or as 0 (resp.1) when said ratio is lower than said second threshold; said preprocessing step being followed by the steps of:

(C) detecting in any group of ten successive fields within the preprocessed signals thus obtained, the film pattern formed by said duplicated fields;

(D) switching said preprocessed signals from a first encoding mode to a second one, when said film pattern is detected, or from the second one to the first one, when it is not detected; and the encoding step being such that said switched signals are coded according to the first mode or to the second mode, said first mode corresponding to the coding of sequences of video type and said second one to the coding of sequences in which the fields introduced by duplication have been eliminated.

It is another object of the invention to propose an encoding device allowing to implement said encoding method.

To this end, the invention relates to a device for encoding video signals corresponding to a sequence of frames constituted either from video-type images, at the video format of 30 interlaced frames per second, or film-type images, converted from an original frame rate of 24 Hz to said video type format by means of the 3:2 pull-down technique involving a subdivision of each film frame into two fields and a duplication of two fields within each group of four subdivided frames, characterized in that said device comprises:

(A) means for encoding input signals corresponding to input sequences either coming of film-type or of video type;

(B) a stage for detecting in the input signals of the encoding device a sequence of film-type;

(C) means for switching, only when such a detection by means of said detecting stage has occurred, from a first output corresponding to a first mode of operation of said encoding means to a second output corresponding to a second mode of operation of said encoding means, or switching from said second output to the first one when said detection no longer occurs, said first mode corresponding to the coding of sequences of video type and said second one to the coding of sequences in which the fields duplicated according to the 3:2 pull-down technique have been eliminated.

BRIEF DESCRIPTION OF THE DRAWINGS

The present invention will now be described, by way of example, with reference to the accompanying drawings in which.

DETAILED DESCRIPTION OF THE INVENTION

The method according to the invention has for object to implement an encoding method in which a preprocessing operation is provided for weakening the effect of noise. As said hereinabove, it is observed that, every five differences between fields of the same parity, the absolute value at the pixel position where the object is displayed in film mode is theorically (when there is no noise) equal to zero: pixels should be exactly identical. Due to noise, this equality criterion is no longer strictly verified: the method now proposed will allow to discriminate identical pixels and dissimilar ones.

Figure 5:
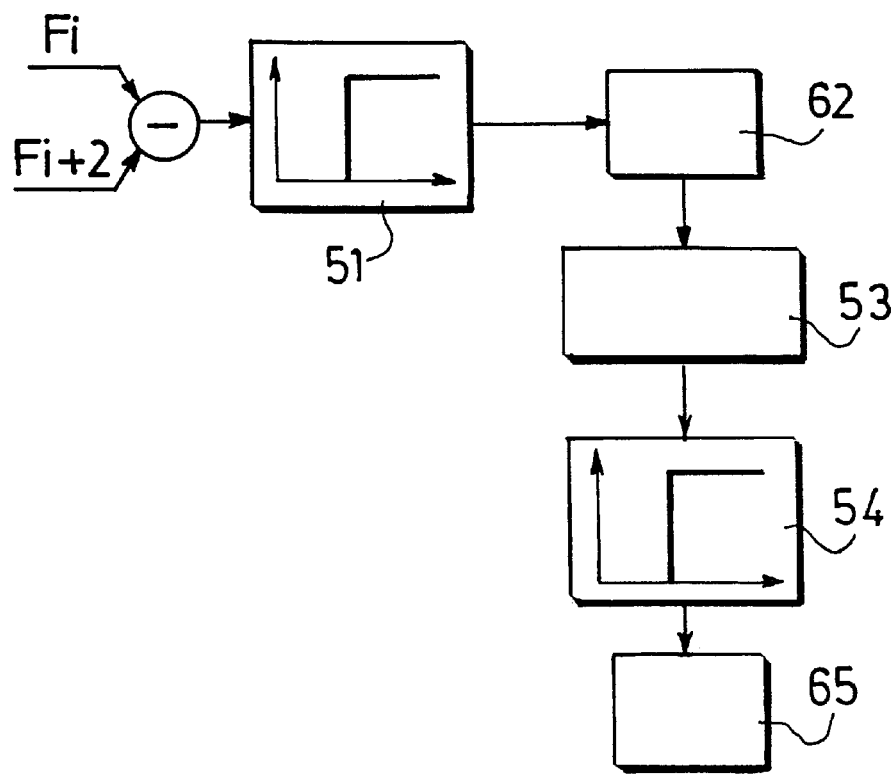
FIG. 5 illustrates an example of preprocessing device for the implementation of the preprocessing step according to the invention.

According to the preprocessing device 72 of FIG. 5 showing an example of implementation of said method, a circuit 51 is first provided for carrying out a thresholding step applied on each absolute pixel-to-pixel field difference F[i+2]−F[i]. If an absolute value of the field difference is equal to or greater than a predefined threshold T1, the pixel is marked as 1, which corresponds (for instance) to pixels not considered as equal. If said absolute value is lower than this threshold, the pixels are marked as 0 and considered as equal.

Figure 6:
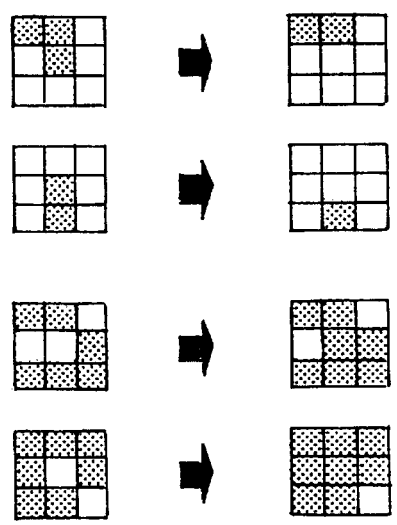
FIG. 6 gives some examples of pseudo-median filters.

A circuit 62 may be provided for implementing after said thresholding step an additional step intended to optimize the thresholded picture. The optimizing circuit 62 is in the present case a so-called pseudo-median filter which modifies or not the value 0 or 1 of each pixel according to the values of the neighbouring pixels and its own value considered together. The decision of modifying or not the value is for instance taken according to the following relations (1) and (2), as illustrated in FIG. 6 that shows some examples of pseudo-median filtering decisions:

if [($NBNP<a$) and ($VP=1$)], $VP=0$     (1)

if [($NBNP>b$) and ($VP=0$)], $VP=1$     (2)

where NBNP is the number of neighbouring pixels marked as 1 after the first thresholding step, VP is the value of the considered pixel (to which the pseudo-median filtering step is applied), and a, b are in the present example equal to 3 and 5 respectively.

A step of measure of density is then carried out in a circuit 53, for instance on 4×2 windows within the field structure. An average number of "1" per "4×2" block, called ANB1, is first calculated:

$$ANB1 = NBTB1/NB42B \quad (3)$$

where NBTB1 is the total number of bits equal to 1 and NB42B is the number of "4×2" blocks. The percentage of "1" is calculated in each case, compared to the average number of "1". If this percentage is equal to or greater than a predefined threshold T2 (second thresholding step, carried out by a circuit 54), the pixels within the considered "4×2" block are all set to 1, while they are set to 0 when said percentage is smaller than T2. This test for each block may be written (NBB1/BL being the number of bits at 1 in each "4×2" block):

if $(((NBB1/BL) \times 100)/(ANB1)) \geq T2$, the pixels within the considered blocks are marked as 1 and edited in film mode.

else: said pixels are marked as 0.

Figure 1:
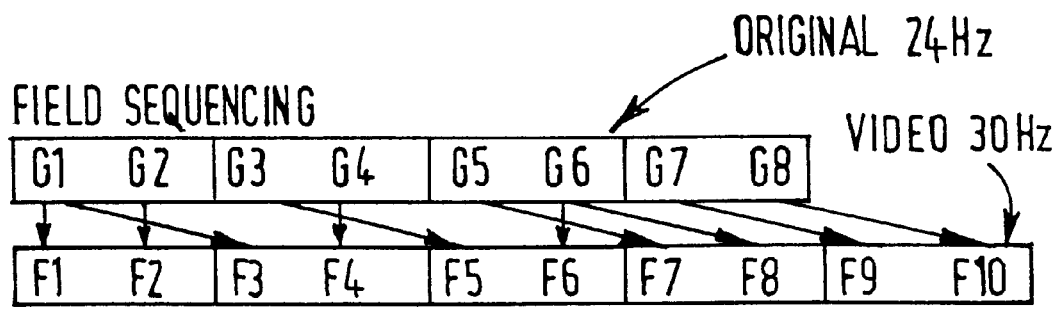
FIG. 1 illustrates the 3:2 pull-down technique allowing to construct five interlaced frames from four original sequential frames.
Figure 2:
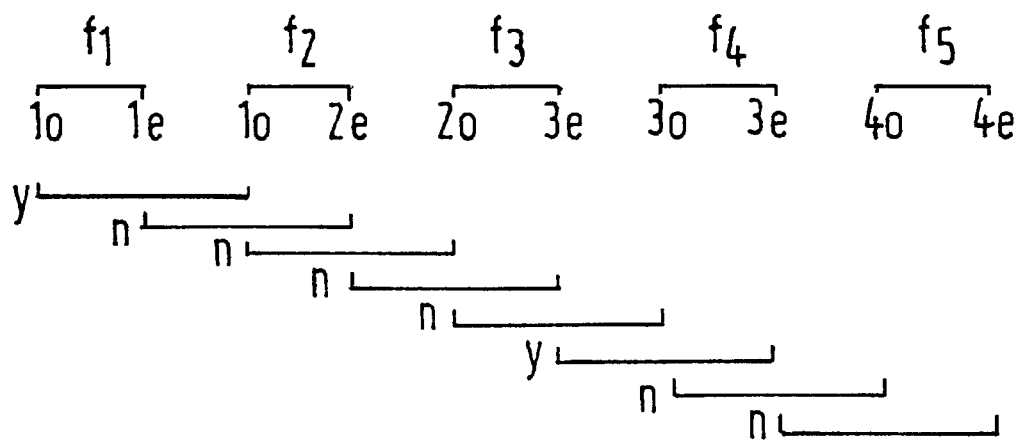
FIG. 2 shows how fields are sequenced in the film mode format and illustrates a set of tests (identical ? or not ?) to be carried out for the detection of a 3:2 pull-down structure.

When following the complete preprocessing operations thus shown in FIG. 5, it is now possible to recognize the film mode pixels (i.e. the pixels belonging to the object(s) edited in film mode). The detection of said film mode is based, as already illustrated in FIG. 2, on the analysis of a group of five frames (or ten fields), done individually for each pixel: if all the conditions CD2 are fulfilled (the equality being strictly verified), then the pixel is detected and marked as being coded in film mode. A pseudo-median filtering step, carried out by a circuit 65 identical to the circuit 62, may be provided in order to remove the possible small error in the detection operation (such a pseudo-median filtering step may also be carried out just after the density measuring step).

Figure 3:
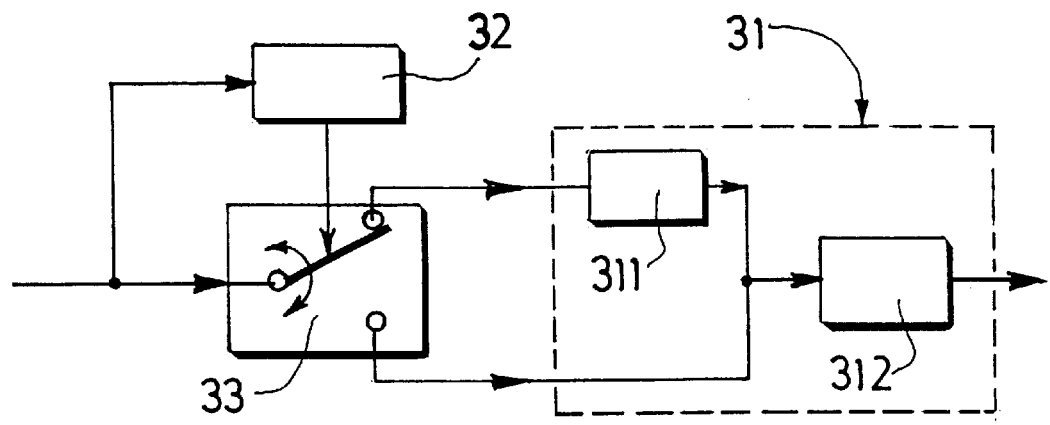
FIG. 3 shows an encoding device in which the method according to the european patent application previously cited is implemented.
Figure 7:
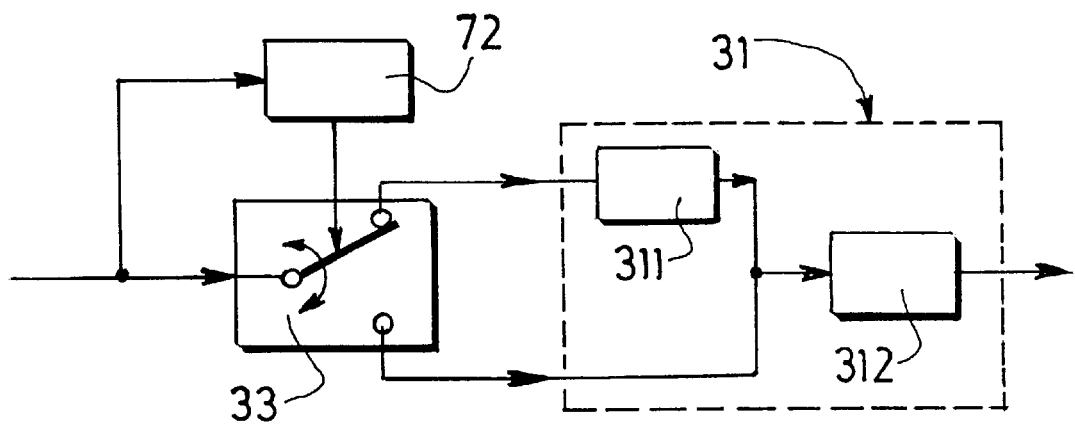
FIG. 7 shows an encoding device which comprises a preprocessing device according to the invention.
Figure 4:
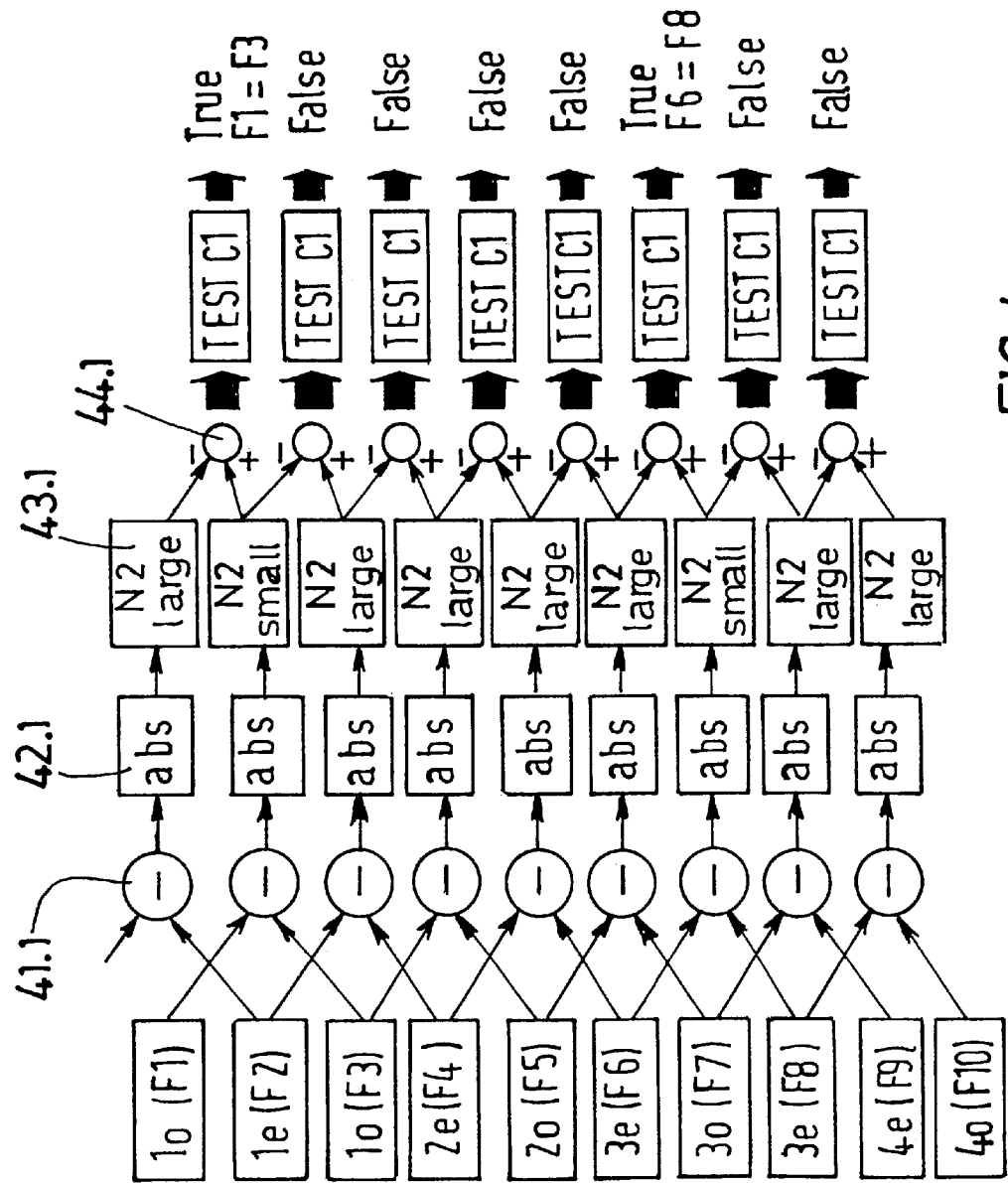
FIG. 4 is an implementation of a preprocessing device comprised in the encoding device of FIG. 3.

An encoding device in which the preprocessing device 72 is implemented is shown in FIG. 7, encoding means and switching means being identical to those of FIG. 3 and therefore designated by the same references. In said figure, switching means 33 are provided for switching, only when a detection of an object of film type in the video sequence has occurred, from a first mode of operation, in which the two repeated fields of the 3:2 pull-down structure are eliminated by means of the suppressing stage 311, to a second one corresponding to a direct connection from the input of the encoding device to the input of the coding stage 312 (this coding stage being, as in FIG. 3, located downstream of said switching means).

What is claimed is:

1. A method for encoding video signals corresponding to a sequence of frames constituted either of video-type images, at the video format of 30 interlaced frames per second, or film-type images, converted from an original frame rate of 24 Hz to said video type format by means of the 3:2 pull-down technique involving a subdivision of each film frame into two fields and a duplication of two fields within each group of four subdivided frames, characterized in that the encoding step of said signals is preceded by a preprocessing step which comprises the sub-steps of:

(A) thresholding the eight absolute values of the successive pixel-to-pixel differences between fields of the same parity for each group of ten successive fields within input signals, each pixel being marked as 1 (resp.0) when the corresponding absolute value is equal to or greater than a first predefined threshold or as 0 (resp.1) when said absolute value is lower than said first threshold;

(B) measuring the density of "1" (resp."0") per block of m×n pixels of the field structure, said density being computed for each of said blocks by means of a comparison, to a second predefined threshold, of the ratio between the number of bits at 1 in each block and the average number of bits at 1 in all the blocks, each pixel being marked as 1 (resp.0) when said ratio is equal to or greater than said second threshold or as 0 (resp.1) when said ratio is lower than said second threshold;

said preprocessing step being then followed by the steps of:

(C) detecting in any group of ten successive fields within the preprocessed signals thus obtained, the film pattern formed by said duplicated fields;

(D) switching said preprocessed signals from a first encoding mode to a second one, when said film pattern is detected, or from the second one to the first one, when it is not detected; and the encoding step being such that said switched signals are coded according to the first mode or to the second mode, said first mode corresponding to the coding of sequences of video type and said second one to the coding of sequences in which the fields introduced by duplication have been eliminated.

2. A device for encoding video signals corresponding to a sequence of frames constituted either from video-type images, at the video format of 30 interlaced frames per second, or film-type images, converted from an original frame rate of 24 Hz to said video type format by means of the 3:2 pull-down technique involving a subdivision of each film frame into two fields and a duplication of two fields within each group of four subdivided frames, characterized in that said device comprises:

(A) means for encoding input signals corresponding to input sequences either of film-type or of video type;

(B) means for thresholding the eight absolute values of the successive pixel-to-pixel differences between fields of the same parity;

(C) means for measuring the density of "1" (resp."0") per block of m×n pixels of the field structure, said measure leading to mark each pixel as 1 or 0;

(D) a stage for detecting in the input signals of the encoding device a sequence of film-type;

(E) means for switching, only when such a detection by means of said detecting stage has occurred, from a first output corresponding to a first mode of operation of said encoding means to a second output corresponding to a second mode of operation of said encoding means, or switching from said second output to the first one when said detection no longer occurs, said first mode corresponding to the coding of sequences of video type and said second one to the coding of sequences in which the fields duplicated according to the 3:2 pull-down technique have been eliminated.

3. An encoding device according to claim 2, wherein said encoding means comprise in series, between a first input and their output, a suppressing stage, provided for eliminating said duplicated fields, and a coding stage, a direct connection being also provided between a second input of said encoding means and the input of said coding stage, and said first and second inputs of the encoding means being connected to the first and second outputs of said switching means.

* * * * *